Oct. 30, 1934.  V. E. FLODIN  1,978,452
METHOD OF MAKING PIPE FITTINGS
Filed Dec. 20, 1930  2 Sheets-Sheet 1
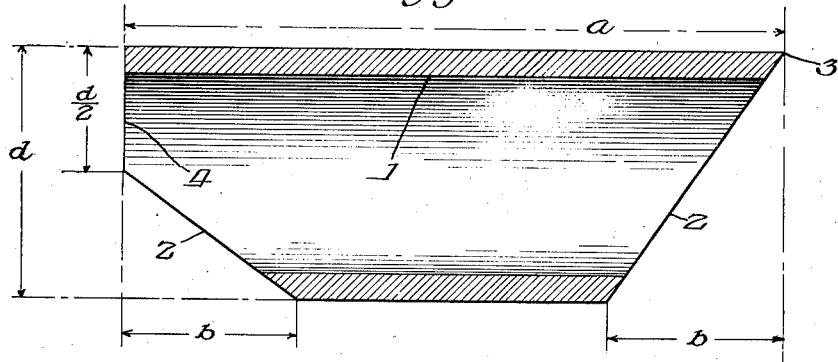
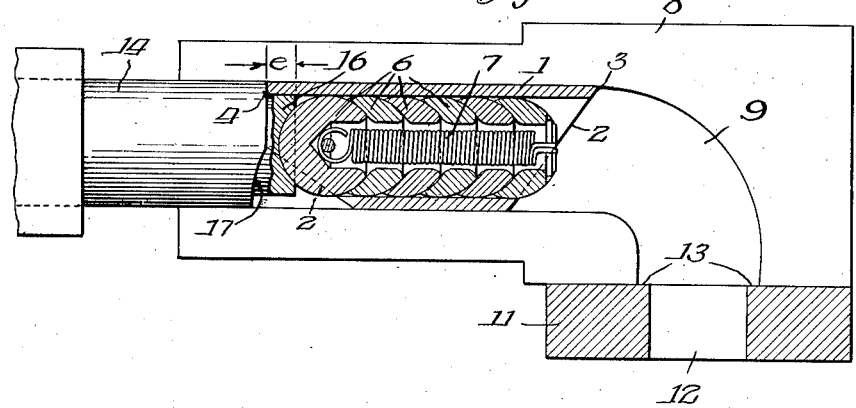
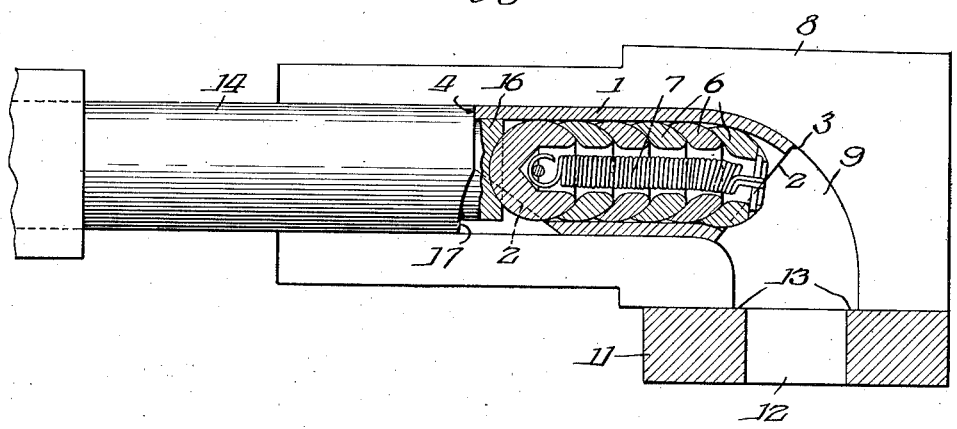
Inventor
Victor E. Flodin
By Wilson, Dowell, McCanna & Rehm
Attys Oct. 30, 1934.   V. E. FLODIN   1,978,452
METHOD OF MAKING PIPE FITTINGS
Filed Dec. 20, 1930   2 Sheets-Sheet 2
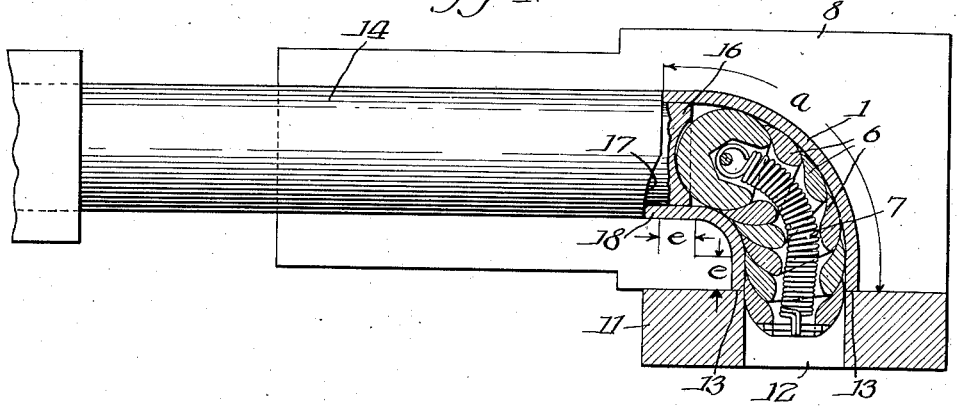
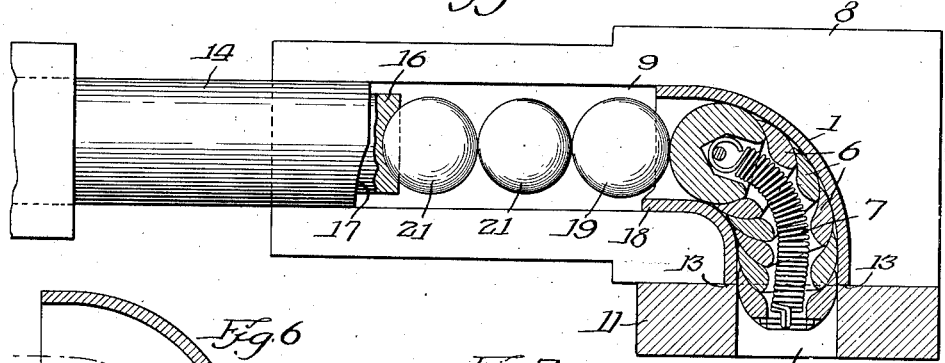
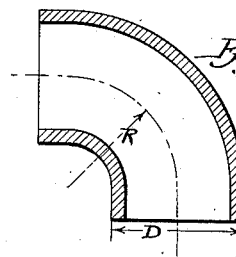
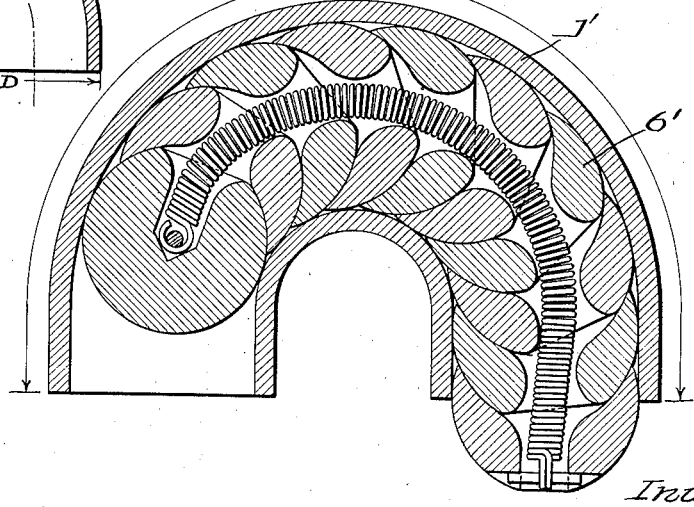
Inventor:
Victor E. Flodin.
By Wilson, Dowell, McCanna & Rehm
Attys
Witness
R. B. Davison Patented Oct. 30, 1934

1,978,452

UNITED STATES PATENT OFFICE 1,978,452

METHOD OF MAKING PIPE FITTINGS

Victor E. Flodin, Oak Park, Ill., assignor to Crane Co., Chicago, Ill., a corporation of Illinois.

Application December 20, 1930, Serial No. 503,677

4 Claims. (Cl. 29—157)

This invention relates to pipe fittings and more specifically the method of manufacturing the same.

Those skilled in the pipe fitting art have for many years endeavored to produce, particularly on a commercial scale, pipe fittings from tubing as distinguished from cast or forged fittings. For instance, pipe bends have been manufactured and utilized in place of cast elbows in some instances where a short bend was not necessary and where extreme conditions of pressures and temperatures were not prevalent. Pipe bends, however, have inherent limitations as to radius of curvature and structural deficiencies and are acknowledged to be inferior in most instances and unsuitable for many uses.

The present day trend toward welded pipe lines also increases the desirability and demand for fittings manufactured from tubing or pipe which lend themselves to welded joints and in which the flow of the fluid being conducted thereby is not materially interrupted and where the outside dimensions are not materially increased over that of the conduit itself.

As has been stated, attempts have been made heretofore to bend a tubing or pipe into fittings such as elbows and return bends but the results have been very unsatisfactory due to the fact that the bending operation disrupts the internal molecular structure of the metal itself and considerably weakens the fitting. This is due to the fact that in bending tubing the outer surface of the bend is stretched to make the increased length, whereas the inner surface is compressed. Both the stretching and the compressing disturbs the molecular structure of the metal and weakens the walls of the tube to a prohibitive state. This defect is particularly objectionable where severe service conditions prevail such as high temperatures or high pressures or both.

Other attempts have been made to produce a satisfactory fitting in which attempts the metal was heated prior to or during the bending operations. This again disturbed the internal structure of the metal causing internal strains to be set up which resulted in weakening of the fitting thus produced.

It is the purpose of this invention to provide a fitting formed directly from tubing or pipe which is of substantially homogeneous molecular structure throughout and which does not have the inherent disadvantages previously mentioned.

It is an object therefore of this invention to provide a method of forming a fitting in which the structure of the metal in the finished product is not materially disturbed but retains its original internal construction and normal strength.

It is a further object to provide a method of manufacturing such a fitting which may be applied equally well to the softer metals such as brass or to the harder ferrous metals such as steel tubing.

It is still a further object of this invention to provide a method by which a fitting may be constructed from tubing and in which the turn may be of considerably shorter radius than has been heretofore possible and in which terminating ends have straight portions of substantial length which permits of the formation thereon of suitable connecting means.

In accordance with this invention seamless tubing is preferably, although not necessarily, used and the length thereof of tubing necessary is carefully calculated for the particular fitting desired and to include the straight end sections desired. The tubing is cut to the exact length of the longest outside dimension of the finished fitting and excess material is removed by mitering the ends. The cut piece of tubing is thereafter formed into the desired configuration by means of a suitable punch and die without changing the length of metal, i. e. without stretching the material and with very little compressing thereof. In other words the finished turned or formed fitting is of substantially uniform section and internal construction throughout.

The entire process is preferably performed with the metal cold, that is, at room temperature thus eliminating any possibility of burning, tempering, or embrittling the metal. However, under certain conditions, as, for example, where extremely heavy tubing is being handled, it may be desirable to heat a section of the tubing, in order to render the material more easily workable. Furthermore, the punch and die members are so constructed as to provide substantially straight terminating ends to the fitting. The tubing is maintained in circular condition throughout the process by a flexible but incompressible internal mandrel. If desired the interior wall surface of the fitting may be smoothed while the fitting is within the forming die by means of a suitable punch member.

A better understanding of this invention will be obtained from considering the following description of one embodiment thereof given in connection with the drawings:

Fig. 1 is a longitudinal section of a piece of tubing or pipe cut to the proper length and size to form a 90° elbow.

Fig. 2 is a vertical longitudinal view through approximately the center of a die and punch illustrating the beginning of the forming stroke of the punch.

Fig. 3 is a similar view showing the forming stroke farther advanced.

Fig. 4 is a similar view illustrating the section of tubing completely formed into a 90° elbow.

Fig. 5 illustrates the action of the plunger in removing the mandrel and smoothing the interior surface of the fitting.

Fig. 6 is a side elevation of a fitting produced by this invention illustrating the relation of radius of curvature to the diameter of the fitting; and Fig. 7 is a transverse section of a return bend fitting and mandrel at the end of the forming stroke of the plunger.

Referring particularly to Fig. 1, there is illustrated a section of tubing 1 cut in the proper manner to provide a 90° elbow. The total length $a$ of the longer side of the tube is exactly equal to the length of the outer wall surface along the outer curvature of the finished fitting as illustrated in Fig. 4. The ends are mitered as at 2, the cut off lengths $b$ along the lower half of the wall that will become the inner curved wall when the tube is fully formed, being equal. This disposes the remaining wall portion substantially centrally of the tube.

What is to be the leading end of the tube is mitered sharply to a point as at 3 whereas the trailing end is not cut sharply to a point but in such a manner as to leave a half circular butt end 4, i. e., the lower half only is chamfered. This butt end or surface is indicated by $d2$, the full diameter of the tube being indicated as $d$.

The fitting being described is designed to have straight terminating end portions $e$ (Fig. 4) which may be provided with any desired type of connections such as threads for screw connections or channels for Victaulic type connections. Any other type of connection may of course be used.

The tube cut to proper length and manner is substantially filled with an internal mandrel. The mandrel illustrated is composed of a series of inter-fitting spherical case hardened steel balls 6 secured together by a spring 7. The diameter and number of the balls is so chosen that one end ball may be positioned projecting beyond the fitting with its diameter disposed at the leading lower end wall of the tube and with the outer extremity of the other end ball lying within the trailing end. It is obvious that any other type of internal mandrel which will support the inner surface of the tube at a sufficient number of closely associated points will suffice.

The tube with the mandrel thus positioned therein is placed within a die block 8 as shown in Fig. 2. The die block 8 has a die recess 9 therein of the desired configuration. In the present instance the die recess is in the form of a 90° elbow. The diameter of the recess is substantially equal to the outer diameter of the tubing or as nearly thereto as possible due allowance being made for slight variations in tube diameters for a given size. The lower end of the die recess is partially closed by a block 11 having an aperture 12 therein disposed concentrically with the discharge end of the die. The diameter of aperture 12 is slightly greater than the inside diameter of the tube being formed into the fitting. This will leave an annular shoulder 13 of slightly less width than the wall thickness of the tube, which shoulder serves to limit the movement of the tube in the forming operation.

The forming operation is best illustrated in Figs. 2 to 5 inclusive. In Fig. 2 the first step in operation is illustrated. As can be seen a plunger or punch 14 of proper diameter to slidingly fit within the die recess is moved into engagement with the trailing or rear end of tube 1. The forward or leading end of the punch is reduced as at 16, to a diameter equal to the interior diameter of the tube. The projecting reduced portion is of a length $e$ equal to the desired straight terminating end portion of the finished fitting. The lower half of the shoulder formed at the junction of the reduced end portion of the plunger with the remainder of the plunger is cut away or recessed as at 17 to provide for sufficient clearance to receive any excessive metal 18 (Fig. 4) which may result from an inaccuracy in calculation of the material necessary in the tube. The end surface of the end portion 16 is also concaved upon a radius equal to the diameter of ball 6.

Any suitable means for supporting the die and for actuating the punch may be employed it merely being necessary that sufficient rigidity and power be present.

From the initial position shown in Fig. 2 the punch 14 moves to the right and forces the tube and mandrel together into the die recess. Further movement of the tube and mandrel is illustrated in Fig. 3 in which the tube is illustrated as being forced partially around the curve in the die recess.

As the punch continues its movement to the right the tube and internal mandrel are forced and partially formed into the position illustrated in Fig. 4. The leading edge 2 of the tube engages the annular shoulder 13 and provides an even terminating edge to the fitting. It must be borne in mind that during the foregoing forming process it is not necessary to heat the metal, that is, it may be formed cold or at normal room temperature and that the tube and mandrel move together.

If the length of the underside or lower half of the tube has not been calculated accurately any surplus metal 18 will project into the clearance space provided by the cut away portion 17 of the punch.

The fitting thus formed with its curved portion and two straight terminating end portions is left in the die and the punch withdrawn. Due to the partial forming action along the lower or inner curved wall the metal of this wall may be forced to some extent into the crevices between adjacent balls of the mandrel and thus leave the inner curved surface of the fitting slightly uneven. To overcome this imperfection which may be objectionable in some instances and to remove the mandrel a hard ball 19 having a diameter equal to the internal diameter of the tube is forced through the tube. This ball serves to smooth and roll out any imperfections on the interior of the tube and also pushes the interior mandrel out ahead of it. The same plunger may be used to force ball 19 through the tube and for this purpose a series of slightly smaller balls 21 may be inserted between the larger ball 19 and the end of plunger 14. The die 8 may thereafter be opened and the finished fitting removed. If there has been any surplus material 18 along one end of the fitting this may be trimmed off in any suitable manner. Thereafter the straight end portions of the fitting may be provided with any suitable means of connection.

By the process and apparatus involved in this invention a fitting having a turn therein may be provided in which the radius of curvature of the turn relative to the diameter of the fitting is considerably less than has heretofore been possible. This feature of this invention is best illustrated in Fig. 6 which shows the relation of the radius of curvature R to the diameter of the tubing D. It has been found that by this invention the turn may be made very short, that is, the ratio of R to D may be less than 1 to 1. As can be appreciated by those skilled in this art this feature of this invention is an extremely important one and a real advance in the fitting art.

In Fig. 7 there is illustrated what is generally termed a return bend partially completed. A fitting of this character may also be produced by the method and apparatus previously described. In making a fitting of this character the length of the tube as cut will be equal to $a'$, which is the distance around the outside of the outer wall of the bend. The ends will be mitered as previously described leaving what is to be the inner curved wall of the fitting substantially at the center of the tube as it is cut. A mandrel composed of balls 6' is inserted within the tube as previously described with one-half of the ball extending beyond the end of the tube as is clearly shown in Fig. 6. The fitting is completed as previously described.

From the foregoing description it is apparent that a new fitting as well as a new method of manufacturing a fitting has been provided. Heretofore it has not been possible to produce a fitting other than a cast fitting in which the molecular structure of the metal comprising the fitting was uniform, that is, without internal strains and stresses. The fitting provided by this invention is a turned and formed fitting as distinguished from a forged cast or bent fitting. The fitting is of uniform section and molecular structure throughout due to the fact that the metal is not disturbed nor distorted to an appreciable extent. Where the metal is disturbed to any extent at all it is kneaded and thus has an improved molecular structure.

The process employed may be performed cold which eliminates all of the many harmful effects resulting in heating the metal. Furthermore the formation of the metal which in some respects is similar to extruding the metal, takes place only upon the inside half of the fitting and this forming operation is reduced to a minimum by reducing the amount of metal upon the inside half of the fitting to the necessary minimum. It is to be noted that the pressure applied to the fitting during the process of formation is a pushing pressure in a direction parallel to the axis of the tube and not transverse thereto.

The process employed also makes it possible to provide a turned fitting with straight end portions tangent to the turn. The length of these straight sections may be of any desired length within reason.

It has been found advantageous to chromium plate the inner surface of the die recess to reduce the friction and to increase the hardness and wear resistance of this surface. It has also been found advantageous to grease the contacting surfaces to still further reduce friction during the forming movements.

It is obvious that changes may be made in the details of the apparatus employed as well as in the configuration of the fitting illustrated without departing from the spirit and scope of this invention as defined in the following claims.

I claim:

1. The improved method of making a bowed pipe fitting from metal tubing which consists in providing a blank cut from such tubing, substantially filling the blank with flexible metallic mandrel means affording a continuous series of closely adjacent supports for the interior wall of the blank, the blank being internally supported by said mandrel means in such manner as to permit bending the blank, and imparting to the blank the desired bowed form while maintaining it so internally supported by forcing it into a die recess of corresponding shape while simultaneously forcing said mandrel means to move with and at the same speed as the blank.

2. The improved method of making a bowed pipe fitting from metal tubing which consists in providing a blank cut from such tubing, substantially filling the blank with flexible metallic mandrel means affording a continuous series of closely adjacent supports for the interior wall of the blank, the blank being internally supported by said mandrel means in such manner as to permit bending the blank, and imparting to the blank the desired bowed form while maintaining it so internally supported by forcing it into a die recess of corresponding shape while simultaneously forcing said mandrel means to move with and at the same speed as the blank, and then forcing out the mandrel means and ironing or smoothing the interior of the formed blank by forcing therethrough a hard ball of a diameter equal to the interior diameter of the tubing.

3. The improved method of making a bowed pipe fitting from metal tubing which consists in providing from such tubing a blank with reversely mitered ends, only one end being mitered for the entire diameter thereof and the other end being mitered for about half the diameter but the lengths of the mitered portions being about equal, substantially filling the blank with flexible metallic mandrel means affording a continuous series of closely adjacent supports for the interior wall of the blank, the blank being internally supported by said mandrel means in such manner as to permit bending the blank, and imparting to the blank a desired bowed shape with the longest dimension of the blank at the outer side of the curve by forcing said blank into a die recess of corresponding shape while internally supporting the blank by said flexible metallic mandrel means, the blank being forced into the die by pushing on the butt end portion of the blank at that end which is mitered for only half of its diameter, the said flexible mandrel means being forced to move with and at the same speed as the blank.

4. The improved method of making a bowed pipe fitting from metal tubing which consists in providing from such tubing a blank with reversely mitered ends, only one end being mitered for the entire diameter thereof and the other end being mitered for about half the diameter but the lengths of the mitered portions being about equal, the greatest length of the blank being equal to the length of the intended fitting along its outside line of curvature and the shortest length being approximately equal to the length of said fitting along its inside line of curvature, the radius of curvature of the bow or bend of the fitting being not greater than the diameter of the tubing, and forming said fitting by forcing said blank into a die recess of corresponding shape while internally supporting the blank by flexible metallic mandrel means, the blank being forced into the die by pushing on the butt end portion of the blank at that end which is mitered for only half of its diameter, the greatest and shortest lengths of the blank being maintained substantially constant during the forming of the fitting.

VICTOR E. FLODIN.